United States Patent [19]

Bailey

[11] 3,911,166

[45] Oct. 7, 1975

[54] METHOD OF TREATING GLASS HEADER CAPACITORS TO REDUCE LEAKAGE CURRENTS

[75] Inventor: John E. Bailey, Needham, Mass.

[73] Assignee: The Foxboro Company, Foxboro, Mass.

[22] Filed: Jan. 30, 1974

[21] Appl. No.: 437,813

[52] U.S. Cl. .................. 427/79; 317/258; 427/387
[51] Int. Cl.² ..................... C03C 17/00; B05D 5/12
[58] Field of Search............ 117/229, 123 R, 54, 88, 117/97; 106/12

[56] References Cited
UNITED STATES PATENTS

| | | | |
|---|---|---|---|
| 2,986,595 | 5/1961 | Fierd et al. ........................ | 117/229 |
| 3,801,361 | 4/1974 | Kitaj ................................ | 117/54 X |

FOREIGN PATENTS OR APPLICATIONS

| | | | |
|---|---|---|---|
| 246,489 | 1/1961 | Australia.............................. | 117/229 |

Primary Examiner—Mayer Weinblatt
Attorney, Agent, or Firm—Parmelee, Johnson & Bollinger

[57] ABSTRACT

A method for silicone treating glass header capacitors to reduce surface current leakage in high humidity environments without adversely affecting the capacitor's normal physical and electrical characteristics. The silicone is an alkyl-alkoxysilane applied to the glass header without formation of metal corrosive by-products and without the need for damaging high temperature curing. The treated capacitors exhibit little increased current leakage in environments of 100% relative humidity compared to 30% relative humidity.

4 Claims, No Drawings

METHOD OF TREATING GLASS HEADER CAPACITORS TO REDUCE LEAKAGE CURRENTS

BACKGROUND OF THE INVENTION

1. Field of the Invention

This invention relates to glass header insulated capacitors and particularly to a method of treating such capacitors to reduce their surface current leakage in high humidity environments and to capacitors so treated.

Glass has been extensively utilized for making insulators including use, together with metal, for hermetic encapsulation of capacitor elements. In such applications, the exposed glass surface of a metal-glass header desirably exhibits surface electrical properties which will assure that the accumulation or leakage of surface charges is minimized. However, the electrical properties of glass surfaces are such that surface conductivity rises with the relative humidity due, it has been theorized, to adsorbed water which may form an electrolyte with alkali dissolved from the glass. Thus, surface resistivities have been found to decrease with increasing relative humidity resulting in a rapid rise in surface leakage. Exposure to moist air apparently permanently affects the glass surfaces so that the surface degradation is not reversible and after drying the surface rapidly readsorbs moisture when humidity exceeds 30% relative humidity. 2. Description of the Prior Art It has been proposed to lower the surface conductivity of glass by various surface tratments. One method suggested is to coat the surface with a water repellent material which will prevent the formation of a continuous water layer. Waxes and quaternary ammonium compounds such as alkyltrimethylammonium bromide have been used to obtain a hydrophobic layer on the glass surface. Glass has also been rendered water repellent by the application of silicone compounds which form chemisorbed layers on the glass.

Silicone treatments are described in "The Properties of Glass Surfaces" by L. Holland, John Wiley and Sons, Inc., New York, New York (1964) at pages 480, et seq. The silicone layer may be applied in one of two principal ways. One may use organosilicon chlorides which react with water adsorbed to the glass and thereby release hydrochloric acid and expose the surface atoms which chemisorb a silicone layer. Alternatively, one may treat the glass with a silicone fluid and heat cure the glass to remove the adsorbed water.

The prior art organosilicon chloride methods of treating glasses is not particularly suitable to treatment of glass used for sealing metal lead-in wires or when used in combination with metal components such as in metal-glass header capacitors. The reason for this is that the acidic nature of the silicone during application will corrode the metal components. Other previously known silicone treatments have involved heat curing at temperatures which would have a deleterious effect on the ability of a capacitor to function as such. In addition prior art treatment methods involved safety hazards and required special handling making them economically unfeasible.

SUMMARY OF THE INVENTION

I have found that the aforementioned disadvantages associated with prior art methods of treating glasses with silicones can be overcome and glass header capacitors successfully rendered hydrophobic to yield low leakage surfaces that do not undergo progressive degradation. This is accomplished according to the present invention by treating the glass header capacitor with a silicone that does not require prolonged high temperature baking nor dry boxes or vapor reaction chambers for application, is non-toxic in application and does not produce injurious by-products which will degrade metallurgy, affect solderability or otherwise have a deleterious effect on the capacitor's normal physical and electrical characteristics. The silicone utilized in the invention is an alkyl-alkoxysilane with trifunctional alkoxy groups on the bonding (silicon) end. Application to glass header capacitors is extremely simple and involves merely dipping an uncontaminated glass header in a dilute solution of the silicone and drying under ordinary conditions such as air drying without the need for special apparatus or unusual handling.

Glass header capacitors treated according to this invention demonstrate only minimal increase in current leakage at 100% relative humidity compared to 30% relative humidity. Capacitors that are approximately 250 times better than untreated capacitors with respect to leakage of current have been obtained according to the invention.

Thus, it is an object of this invention to provide a method of treating glass header capacitors to minimize this current leakage under high humidity conditions without adversely affecting normal capacitor physical or electrical properties.

A further object of this invention is the provision of an alkoxysilane-treated glass header cpacitor possessing improved current leakage characteristics under high relative humidity conditions.

The foregoing objects and advantages as well as other objects and advantages will be apparent from the following description of the preferred embodiments of the invention.

DESCRIPTION OF THE PREFERRED EMBODIMENTS

A common metal-glass header capacitor is treated with a cationic alkyl-alkoxysilane obtainable commercially under the product identification "DOW CORNING XZ-2-2300". The capacitor case is of known design and may be a nickel-steel alloy tube having flanged ends through the openings of which can pass metal lead-in wires. These openings or header orifices are sealed with glass headers, introduced as buttons through which the lead-in wire passes, by fusion.

Treatment may constitute exposing the glass headers to a dilute aqueous solution of the alkyl-alkoxysilane by dipping or spraying and permitting the water to evaporate until the glass surface is dry. Air drying is adequate to obtain a fully cured treatment, however, heat may be applied to increase the speed of drying provided that a temperature of 500°F is not exceeded. Once treated, a temperature of 500°F should not be exceeded so that treatment is preferably carried out after high temperature operations such as flame polishing of the glass and the like are completed. Alternatively, the treatment may be carried out after encapsulation of the capacitor and the entire metal-glass header capacitor dipped in the solution. This may be done according to this invention because of the absence of formation of any metal corrosive by-products as a consequence of the application.

It is important that the glass to be treated with the alkyl-alkoxysilane be uncontaminated virgin glass since the silicone does not act as a cleaning agent nor will it restore a degraded surface. Thus, the glass header should be clean and dry prior to treatment and this may be accomplished by special packaging. The alkyl-alkoxysilane used, DOW CORNING XZ-2-2300, is moisture sensitive and will lose its effectiveness if exposed to water prior to use so that care must be exercised in its storage.

The alkyl-alkoxysilane may be applied to hot or cold glass headers and in concentrations as dilute as 0.5%–0.02% of the silicone in water solution. Applied from aqueous solution, the alkyl-alkoxysilane is a cationic silicone with an affinity for the anionic glass surface. Since the silicone is deposited on the glass surface, the solution must be refreshed with additional amounts of silicone in order to maintain the desired concentration. The DOW CORNING XZ-2-2300 silicone used in this invention is a long chain alkyl-alkoxysilane with trifunctional alkoxy groups on the bonding (silicon) end. These groups comprise methyl and higher oxy groups such as ethylene glycol, monoethyl ether, up to Methyl Cellosolve, a known tradename for ethylene glycol monomethyl ether. The carbon chain contains a quaternary amine group. It is theorized, although I do not wish to be bound thereby, that the reaction with a glass surface with an active silica surface proceeds as follows:

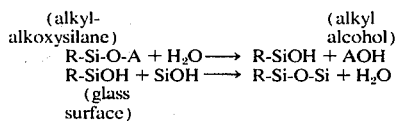

where $R$ = organic group containing functional groups.

$A$ = organic portions of alkoxy groups.

Thus, it can be seen that no acid is formed. Rather an alkyl alcohol, non-corrosive and harmless to the capacitor metal parts, is produced.

DOW CORNING XZ-2-2300 silicone has been known to be a glass lubricant which helps prevent scratching and marring of glass surfaces and as a treatment for obtaining hydrophobic characteristics of water repellency and faster drainage. Its utilization in a method of treating glass header capacitors has not been appreciated heretofore and the absence of deleterious effects on capacitor metal components or electrical characteristics during application of a silicone, as well as the spectacular improvement in leakage characteristics, has heretofore gone unrecognized.

Glass header capacitors treated according to the process described above were tested to determine the current leakage. Only a small increase in leakage at 100% relative humidity compared to 30% relative humidity was observed. For example, a treated capacitor was subjected to 20 volts in an atmosphere of 100% relative humidity and a temperature of 72°F for 12 days without progressive degradation and with a measured gate leakage of only 0.3 picoamperes. In contrast, untreated capacitors subjected to normal environments such as those found in research laboratories have produced surface leakages approaching nanoamperes with 20 volts applied and after only a few hours exposure to the high humidity. A 250 fold improvement with respect to current leakage has been observed with the treated capacitors of the invention over untreated capacitors, an unexpected achievement.

The silicone treated glass header capacitors of the invention find particularly advantageous use in integrator circuits having long time constants but small capacitors requiring low levels of leakage current. They are also useful in technology resulting in higher impedance levels with a greater need for low leakage elements.

I claim:

1. A method for reducing the current leakage of metal-glass header capacitors in high humidity environments by a silicone treatment without adversely affecting the capacitor's normal physical and electrical characteristics comprising the steps of exposing the glass header, while in a virgin uncontaminated state, to a metal-noncorrosive solution of a solvent and an alkyl-alkoxysilane capable of being cured through evaporative drying of the solvent without the application of heat and then drying the glass header at a temperature below that at which the capacitor's electrical characteristics would be adversely affected.

2. A method as claimed in claim 1 wherein the alkyl-alkoxysilane solution consists essentially of a long chain alkyl-alkoxysilane having attached to the silicon end trifunctional oxy groups selected from the group consisting of methyl and higher oxy groups up to ethylene glycol monomethyl ether, in an amount effective to reduce the current leakage when dried, and water and the drying temperature is below about 500°F.

3. A silicone treated metal glass-header capacitor exhibiting reduced current leakage in high humidity environments produced by the process of claim 1.

4. A method as claimed in claim 2 wherein the alkyl-alkoxysilane is present in an amount of 0.02 – 0.5 percent.

* * * * *